United States Patent
Lindley et al.

(10) Patent No.: US 10,423,956 B1
(45) Date of Patent: *Sep. 24, 2019

(54) SYSTEMS AND METHODS FOR CUSTOMER AUTHENTICATION AND DETERMINATION OF RELEVANT SERVICES

(71) Applicant: United Services Automobile Association (USAA), San Antonio, TX (US)

(72) Inventors: Jason W. Lindley, Schertz, TX (US); Donald H. Griffin, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,337

(22) Filed: Jan. 3, 2018

Related U.S. Application Data

(63) Continuation of application No. 15/386,590, filed on Dec. 21, 2016, now Pat. No. 9,904,920, which is a continuation-in-part of application No. 14/842,595, filed on Sep. 1, 2015, now Pat. No. 9,560,204.

(60) Provisional application No. 62/050,886, filed on Sep. 16, 2014.

(51) Int. Cl.
*G06Q 20/40* (2012.01)
*G06Q 30/00* (2012.01)

(52) U.S. Cl.
CPC ....... *G06Q 20/4014* (2013.01); *G06Q 30/016* (2013.01)

(58) Field of Classification Search
CPC .......... G06Q 20/4014; G06Q 30/016
USPC .............. 379/265.01, 266.01, 309
See application file for complete search history.

(56) References Cited

U.S. PATENT DOCUMENTS

| | | |
|---|---|---|
| 6,327,347 B1 | 12/2001 | Gutzmann |
| 6,601,762 B2 | 8/2003 | Piotrowski |
| 7,167,728 B1 | 1/2007 | Wagner |
| 7,206,572 B2 | 4/2007 | Luneau |
| 7,503,489 B2 | 3/2009 | Heffez |
| 8,060,413 B2 | 11/2011 | Castell |
| 8,270,588 B2 | 9/2012 | Schwartz |
| 8,467,512 B2 | 6/2013 | Amir |
| 8,483,365 B1 | 7/2013 | Baxter |
| 8,588,395 B2 | 11/2013 | Hendricks et al. |
| 2004/0131164 A1 | 7/2004 | Gould |
| 2008/0181379 A1 | 7/2008 | Chow et al. |

(Continued)

*Primary Examiner* — Quynh H Nguyen
(74) *Attorney, Agent, or Firm* — Fish & Richardson P.C.

(57) ABSTRACT

A computer-implemented method and system for authenticating identification of a customer during interaction with a company representative. Data is received and stored relating to the customer at a computer. The data includes one or more identification attributes associated with the customer and one or more authentication data attributes associated with the customer. An interaction is commenced between the customer and the company representative. Captured is one or more identification attributes and authentication data attributes relating to customer from the interaction between the customer and the company representative. The customer is identified by matching a captured identification attribute with a stored identification attribute. The customer is authenticated by matching a captured authentication data attribute with a like stored authentication data attribute associated with the identified customer.

20 Claims, 15 Drawing Sheets

(56) References Cited

U.S. PATENT DOCUMENTS

2008/0189212 A1 8/2008 Kulakowski et al.
2012/0076283 A1 3/2012 Ajmera et al.

FIG. 4

FIG. 5A see FIG. 5B — 500 see FIG. 5C see FIG. 5D

Left panel (see FIG. 5B):

Dale Rogers
Commodo ligula eget dolor
Permanent Address
254 Cherry Lane
Chicago, IL 60623

Member Notes
• Excited to learn about investing

| 95% | P&C | - | 5 yrs |
|---|---|---|---|
| Satisfaction | Eligibility | Special Status | Tenure |

Family Click photo for details

| 27yrs Old | 3 Yrs Old | 1 Month Old |
|---|---|---|
| Anderson | Sally | Sam |

PREFERENCES
Product Reviews  ★★★★★
FREE CHECKING
SAVINGS ★★★★★ Reviews
★★★★★ Reviews Channels
WEB
MOBILE
PHONE
IN-PERSON WHAT'S GOING ON.
Local Time
5:24 PM
Current Events
• Chicago Bulls vs. Miami Heat: The Eastern Conference debate
• Companies economic outlook improve in the next 12-18 months
Interests
• Fishing at the lake
• Mountaineering

Right panel top (see FIG. 5C):

PRODUCTS                    Show: [Family] Date  Melissa  LIFE PLAN  [edit]

Making a Home
  Banking
  USAA Checking          $2,345   Financial Security Index   Outlook
  Emergency Fund         $17,000  65% / Actual               APRIL 2011
                                  90% Perceived              • Expecting birth of son Getting Around
  Auto Loan              $12.5k
  Growing Wealth
  International Fund     $32,345
  Income Fund            $17,964  1 Life Insurance Caring for the Family
  529 for Sally          $1,698   Goals
  Start a 529 Fund for Sam Maintaining Health

Right panel bottom (see FIG. 5D):

UNDERSTAND

Reason for Call         Time    Mood       Interest        Interaction Synthesis
Invest money            Lots    Positive   High            • Careful financial planner for his age
(from voiceline)                                           • Wants to support his children's education Current Aspirations     Concerns                           Interaction History
Take a vacation to the  Can his family afford for his      LAST 6 MONTHS Time? Mood: Positive Interest: High
lake this summer        wife to stay home with             Call Reason: 529 for Sally
                        the kids?                          Life Events Captured:
                                                           • Expecting new baby!
                                                           Actions:
                                                           • Started and funded a 529 with $1600.
                                                           • Change a payment day for auto loan to 3rd of
                                                             the month Call Notes              Recent Life Events                 Online Auto Circle
Calling from the road                                      Member Actions: Compared prices on:
Away from computer                                         • Audi TT 2010
                                                           • Honda Odyssey 2004
                                                           • Ford Focus 2007

504 {
- Dale Rogers
- Commodo ligula eget dolor ← 502
- Permanent Address
- 254 Cherry Lane
- Chicago. IL 60623

Member Notes
- Excited to learn about investing } 506
-

| 95% Satisfaction | P&C Eligibility | - Special Status | 5 yrs Tonure |

508 {

Family Click photo for details

| 27yrs Old | 3 Yrs Old | 1 Month Old |
| Anderson | Sally | Sam |

← 510

PREFERENCES
Product Reviews         Channels
FREE CHECKING          WEB
★★★★★ Reviews          MOBILE
SAVINGS                PHONE
★★★★★ Reviews          IN-PERSON WHAT'S GOING ON.
Local Time  ← 512
5:24 PM
Current Events
- Chicago Bulls vs. Miami Heal: The Eastern Conference debate
- Companies economic outlook improve in the next 12-18 months Interests
- Fishing at the lake } 514
- Mountaineering
-

FIG. 5B

| PRODUCTS | Show: [Family] | Date | Melissa | LIFE PLAN | edit |
|---|---|---|---|---|---|

⌂ Making a Home

⊞ Banking
USAA Checking $2,345
Emergency Fund $17,000

⊞ Financial Security Index
65% Actual
90%
Perceived

⊞

🚗 Getting Around
Auto Loan $12.5k

⊞ Growing Wealth
International Fund $32,345
Income Fund $17,964

1 ⊙ Life Insurance

Outlook
APRIL 2011
• Expecting birth of son

👪 Caring for the Family
529 for Sally $1,698
⊙ Start a 529 Fund for Sam

♡ Maintaining Health

⊞ Goals
•

516 — (PRODUCTS panel)
518 — (LIFE PLAN panel)
520 — Outlook

FIG. 5C

UNDERSTAND — 522

Reason for Call
Invest money
(from voiceline)

Current Aspirations
Take a vacation to the Jake this summer

Call Notes
Calling from the road
Away from computer

| Time | Mood | Interest |
|---|---|---|
| Lots | Positive | High |

Concerns
Can his family afford for his wife to stay home with the kids?

Recent Life Events

Interaction Synthesis
- Careful financial planner for his age
- Wants to support his children's education

Interaction History
LAST 6 MONTHS Time? Mood: Positive Interest : High
Call Reason: 529 for Sally
Life Events Captured:
 • Expecting new baby!

Actions:
 • Started and funded a 529 with $1600.
 • Change a payment day for auto loan to 3rd of the month

Online Auto Circle
Member Actions: Compared prices on:
 • Audi TT 2010
 • Honda Odyssey 2004
 • Ford Focus 2007

| OPTIONS EXPLORER | | Start Screen Sharing |
|---|---|---|
| INVESTMENT TYPES | USAA INVESTMENT OPTIONS | |
| ✓ Mutual Funds    IRAs | Mutual Funds | ▼ Sort by: Recommendation — 612 |
| College Savings    Annuities | ⦿ Balanced Strategy Fund    Compare Performance ★★★ | |
| CDS | | 14.18 \| 4.08 |
| | • Lorem ipsum dolor sit amet | |
| FUND FILTERS | • Cum sociis natoque penatibus et | |
| ✓ Risk tolerance | • Donec vitae sapien ut libero | |
| 0   1   2   3   4   5   6   7 | [Donec]   Performance   Ratings   Holdings   Management |
| ✓ Past performance (Upper average) | ○ Moderate | |
| | Nulla consequat massa quis    Funds in Category: 911 | |
| Below                                   Above | enim. Donec pede justo, fringilla | |
| | vel, aliquet nec, vulputate eget,    Upper Category:    Most-Asset | |
| ✓ Time horizon | arcu. In enim justo, rhoncus ut,                               Target As or | |
| 0   1-5   10-20   20-50   50+ | imperdiet a, venenatis vitae,                                   Moderate Funds | |
|      yrs   yrs       yrs      yrs | justo. pede mollis pretium.    Upper Category: 0.96% | |
| | | Expense: |
| ✓ Fund yield | Invest in Fund    Newspaper Listing: Ba/Stra | |
| | Amount    $6000 | |
| | Funding Account    USAA Checking ▶ | |
| Generate recommendations for Dale | Transfer Date    April 15, 2011    🖩 | |
| | Summary via: ✓ Email (preferred) | |
| |                              SMS | |
| | [ Transfer Funds & Send Summary ] | |

FIG. 6D

CONVERSATION SUPPORT

What do you need help talking about?

Why you need life insurance

- "If you were to lose your job tomorrow, how would you support your family?"

Why Sam needs a 529 college savings account

- "Next to saving for retirement, your biggest financial challenge is probably saving for your kids' college education."

FIG. 6E

CALL TRANSFER SYNTHESIS — Close ✕

2LT Vanessa Martinez

Permanent Address
215 Maple Leaf Dr. Apt 5
Charlotte, NC 28201

22 years old

REASON FOR TRANSFER

Talk to advisor about financial life plan
Phasellus viverra nulla ut metus laoreet.
⊙ Based on life event received large inheritance (from NMS rep. Pam Shilling)

LAST CALL INTERACTION SYNTHESIS
- Joined USAA today and purchased renter's ins.
- Recent West Point graduate.
- Inherited large sum from grandmother.

LAST CALL ACTIVITY

15 MINUTES AGO    Lorem: ?  Mood: Positive   Interest: High

Call Reason: Renter's insurance quote

Life Events Captured:
- Graduated from West Point
- Moved into first apartment
- $15,000 inherited from grandmother Actions:
- Verified Eligibility
- Purchased Renters Insurance
- Transferred to MAS for financial planning

SYSTEMS AND METHODS FOR CUSTOMER AUTHENTICATION AND DETERMINATION OF RELEVANT SERVICES

CROSS REFERENCE TO RELATED APPLICATIONS

This application is a continuation of and claims priority to U.S. patent application Ser. No. 15/386,590, filed Dec. 21, 2016, which is a continuation in part of and claims priority to U.S. patent application Ser. No. 14/842,595 filed Sep. 1, 2015, which claims priority to U.S. Patent Application Ser. No. 62/050,886 filed Sep. 16, 2014, which is incorporated herein by reference in its entirety.

FIELD OF THE INVENTION

The present technology relates to improving customer interactions, and more particularly, to establishing rapport between customer service representatives by alleviating a need for obtrusive authentication of the customer during telephone interaction.

BACKGROUND OF THE INVENTION

Customer service representatives are often responsible for a wide variety of tasks. In addition to being proficient in accomplishing particular tasks like updating addresses or other status changes, providing new or updated quotes, responding to billing inquiries, cancelling and renewing services, and entering data related to the customer, the customer service representative is expected to be more than cordial, pleasant, engaging and generally charming.

To support customer service representatives, each has a workstation. The customer service representative relies on their workstation to provide them with information quickly in order to maintain conversational flow with the customer. Despite tremendous computing power and the latest technology, delays are inevitably introduced by the support technology. Additional delays are also created by the customer service representative, whether it be the customer service representative's natural speech cadence, thought process, deliberation over a selection, or simple consideration of what to say or type next.

When dealing with financial products and services, further delay is also introduced because the customer service representative must authenticate the customer. It is often important to conduct advanced authentication to prevent fraud and theft. In addition to taking the necessary information to identify the customer, commonly a series of predetermined questions is used to affirmatively authenticate the customer. Even asking fairly simple questions such as one's social security number or mother's maiden name, introduces significant delay and impedes the customer service representative's ability to quickly and efficiently assist the customer. Efficiency is very important to establishing the desired rapport.

Still further, customer service representatives are expected to mine the customer database for opportunities to make new and additional sales of products and services, often referred to as "upselling." Upselling is critical because it expands revenue with a targeted group, which is predisposed to using the company for goods and services (e.g., existing customers or potential customers who have already reached out to the company).

It is understandable that with all that a customer service representative is expected to juggle, that presenting a warm, confident, informed face to the customer is challenging. Yet, this is exactly what is expected. Thus, a need exists to provide support to the customer service representatives to allow them to represent the company as well as possible.

Referral from one customer service representative to another for specialized services is often desirable. In such a case, traditional call centers have no ability to facilitate hand-off between customer service representatives beyond placing the customer on hold while the first representative tries to fill in the second representative. This not only yields often poor and inconsistent results, but creates dissatisfaction among the customers on hold and after reconnection when details and information already presented must be discussed again.

In view of the above, there is an unmet need to provide companies, such as insurance companies, the ability to streamline interactions with their customers even when performing advanced authentication of the customer is helpful to establishing rapport. The authentication remains valid or is re-performed as necessary when more than one customer service representative speak with a customer during a single or multiple calls.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer-implemented method and system for authenticating identification of a customer during interaction with a company representative is described in which data is received and stored relating to the customer at a computer. The data includes one or more identification attributes associated with the customer and one or more authentication data attributes associated with the customer. An interaction is commenced between the customer and the company representative. Captured is one or more identification attributes and authentication data attributes relating to customer from the interaction between the customer and the company representative. The customer is identified by matching a captured identification attribute with a stored identification attribute. The customer is authenticated by matching a captured authentication data attribute with a like stored authentication data attribute associated with the identified customer.

BRIEF DESCRIPTION OF THE DRAWINGS

So that those having ordinary skill in the art, to which the present embodiments pertain, will more readily understand how to employ the novel system and methods, certain illustrated embodiments thereof will be described in detail herein-below with reference to the drawings, wherein:

FIG. 4 is an exemplary screen shot for review by and interaction with a customer service representative in accordance with the subject technology.

FIG. 5A is another exemplary screen shot for review by and interaction with a customer service representative in accordance with the subject technology.

FIG. 6A is still another exemplary screen shot for review by and interaction with a customer service representative in accordance with the subject technology.

FIGS. 5B-D are views of portions of the screen shot of FIG. 5A.

FIGS. 6B-F are views of portions of the screen shot of FIG. 6A.

FIG. 8 is still another exemplary screen shot for review by and interaction with a customer service representative in accordance with the subject technology.

DETAILED DESCRIPTION

Figure 1:
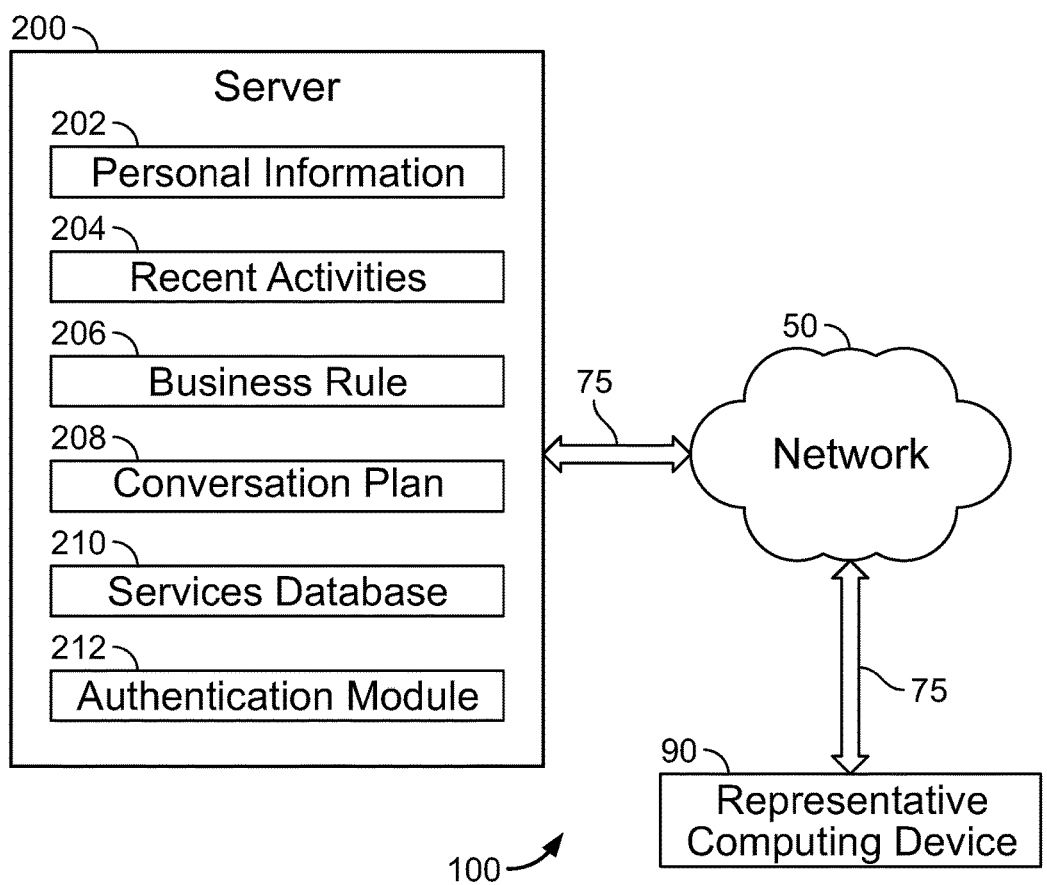
FIG. 1 is an exemplary system for streamlining customer interactions.

The below illustrated embodiments are directed to streamlining and improving customer interactions based on analysis of all available data relevant to the customer. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art.

By way of example, the following description relates to a company that provides a broad array of financial services such as insurance, banking, health insurance, tax advice, investments, automobile buying and financing, retirement planning, consumer shopping, real estate and the like. As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance, the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, the term "insurance policy" may encompass a warranty or other contract for the repair, service, or maintenance of insured property. As used herein, "insured property" means a dwelling, other buildings or structures, personal property, or business property, as well as the premises on which these are located, some or all which may be covered by an insurance policy.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the certain embodiments described herein. Thus the certain embodiments are not to be understood to be limited by what has been particularly shown and described, except as indicated by the appended claims.

Referring to FIG. 1, a hardware diagram depicting a system 100 in which the processes described herein can be executed is provided for exemplary purposes. In one embodiment, system 100 includes a server 200 communicating with a representative computing device 90 across a network 50 with communication channels 75. The server 200 stores personal information 202 about customers, recent activities data 204 related to the customers, business rules 206 to be applied as described herein, conversation plans 208 that are generated, a services database 210, which includes information about various services a company may offer, and an authentication module 212 that performs customer authentication.

For exemplary purposes only, personal information 202 about customers may include the customer's legal name, what name they preferred to be called by, names of their family members (including former family members such as ex-spouses), ages for the customer and their family, how the customer is eligible for coverage (if applicable). The personal information 202 includes information necessary to perform authentication of the customer as described herein. The authentication information may include one or more voice samples, caller identification numbers, hardware-specific data related to one or more mobile devices associated with the customer, media access control (MAC) address, and the like. The authentication module 212 includes the logic and processing capability necessary to accomplish the authentication of the customer.

Recent activities data 204 by the customer may include the customer enrolling in a service that the company offers (e.g., mortgage, automobile loan, auto/home/life insurance, banking, and credit card), changing the settings of a service already enrolled in (e.g., raising the deductible and lowering the premium of an auto insurance policy), calling the company to ask a question and/or discuss a topic, researching information on the company's website, and/or researching information on the internet and later visiting the company's website (e.g., wherein the company's servers may glean past Internet activities based on "cookies").

Business rules 206 may include associations, correlations and/or causations between (1) information and/or past activities and (2) future activities. For example, a business rule may reflect the relationship between (1) a child attaining the age of 15 and (2) adding another member to an auto insurance policy. In another example, a business rule may associate (1) browsing the company's website searching for life insurance information and (2) the subsequent phone call to the company being a request to (2a) enroll in a life insurance policy, or (2b) change the settings of an existing life insurance policy. In yet another example, a business rule may associate (1) a customer attaining retirement age and (2) the customer lowering their life insurance premium to a lower amount.

In one embodiment, a conversation plan 208 may include a series of topics about which the company's representative will suggest discussing with the customer. For example, if the customer is about to turn 65 years old and has a child about to turn 15 years old, the conversation plan may include the representative first suggesting to talk about adding the child to an auto insurance policy, and subsequently discussing if the customer wants to amend their life insurance policy. In yet another example, a conversation plan may include asking about each service the customer is enrolled in with reference being made to the most recent event associated with each service (e.g., the first topic may be asking if the customer wants to amend their recently added home insurance policy, and the second topic may be asking the customer about the additional member she added to her auto insurance policy a year ago).

The services database 210 includes information related to the customer's enrollment in any services that are offered by the company. Such information may include the details of the customer's policies, the details of previous settings to current policies, and the details of the settings to previous policies the customer has enrolled in. For example, if a company offers credit card services, mortgage services, banking services, automobile loan services, investment services, insurance services and housing services, the services database may include information related to their customers' involvement with those services.

The authentication module 212 includes all the necessary programming and information to perform enhanced authentication. The enhanced authentication module 212 may include voice or other biometric files related to each customer along with software routines for determining if captured information matches the information on file.

Figure 2:
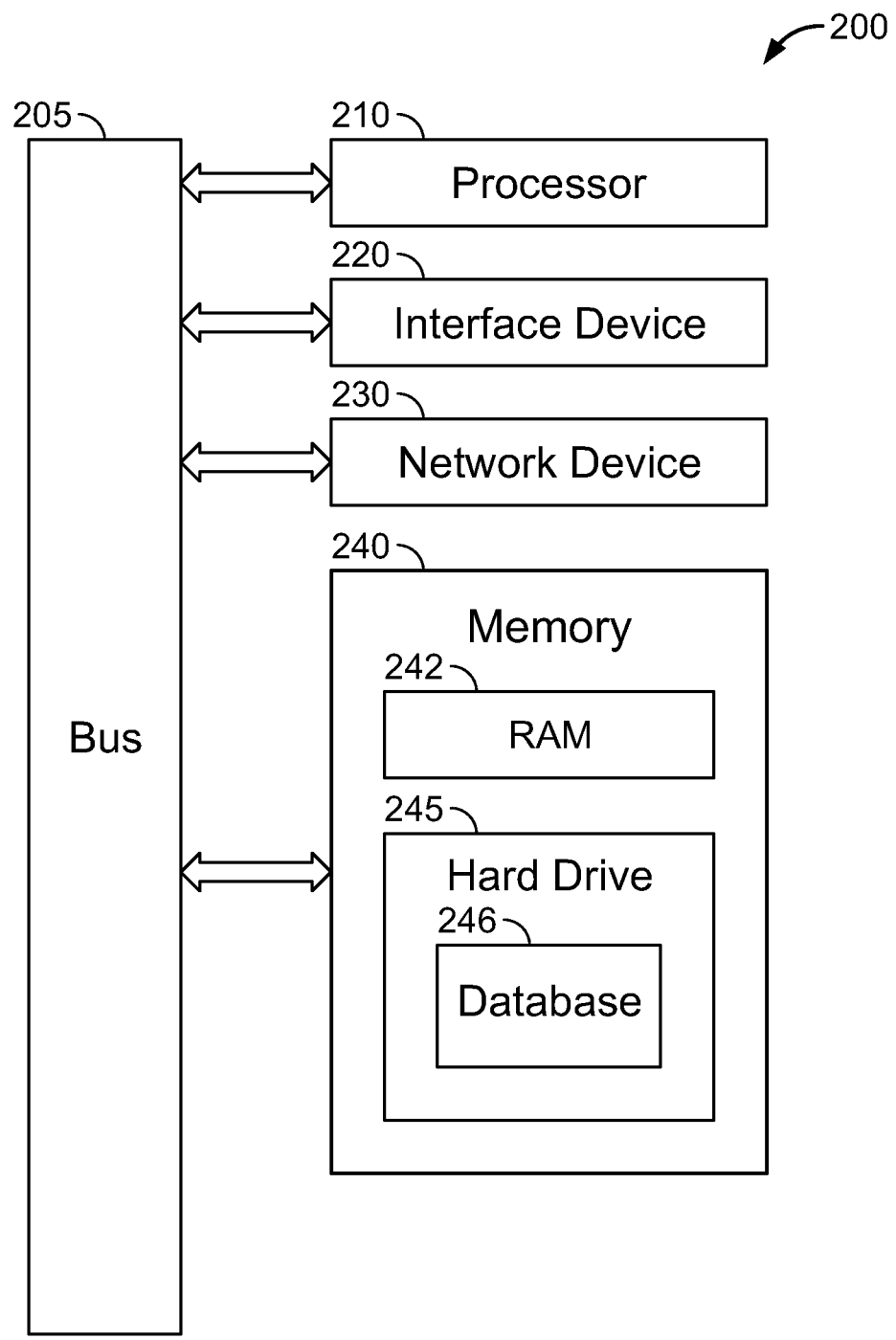
FIG. 2 is a flow chart illustrating an exemplary method of utilizing the exemplary embodiment of FIG. 1.

Turning now to FIG. 2, illustrated therein is an exemplary embodiment of computing device 200 for use in the system 100. Such a computing device 200 is exemplary of how a server 200 and even how a representative computing device 90 may be configured. The following discussion is principally with respect to the computing device 200 when functioning as the server 200. The server 200 preferably includes bus 205, over which intra-device communications travel. A processor 210, interface device 220, network device 230, and memory 240 all communication across the bus 205. The server 200 also preferably includes RAM 242 and hard drive 245 for storage. The computing device 200 may also include a display system, such as a monitor (not shown), particularly when used as a representative computing device 90.

The term "module"/"engine" is used herein to denote a functional operation that may be embodied either as a stand-alone component or as an integrated configuration of a plurality of subordinate components. Thus, "modules"/"engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

Memory 240 is a computer-readable medium encoded with a computer program. Memory 240 stores data and instructions that are readable and executable by processor 310 for controlling the operation of processor 210. Memory 240 may be implemented in random access memory 242 (RAM), a non-transitory computer readable medium, volatile or non-volatile memory, solid state storage devices, magnetic devices, hard drive 245, database 246, a read only memory (ROM), or a combination thereof.

Processor 210 is an electronic device configured of logic circuitry that responds to and executes instructions. Processor 210 outputs results of an execution of the methods described herein. Alternatively, processor 210 could direct the output to a remote device (not shown) via network 50.

It is to be further appreciated that computer networks, upon which the embodiments described herein may interact and/or function, can include a local area network (LAN) and a wide area network (WAN), other networks such as a personal area network (PAN), or any combination thereof. Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. It is to be appreciated that the illustrated network connections of FIG. 1 are exemplary and other means of establishing a communications link between multiple computers may be used.

It should be understood that computing devices 200 each generally include at least one processor, at least one interface, and at least one memory device coupled via buses. Computing devices 200 may be capable of being coupled together, coupled to peripheral devices, and input/output devices. Computing devices 200 are represented in the drawings as standalone devices, but are not limited to such. Each can be coupled to other devices in a distributed processing environment.

Figure 3:
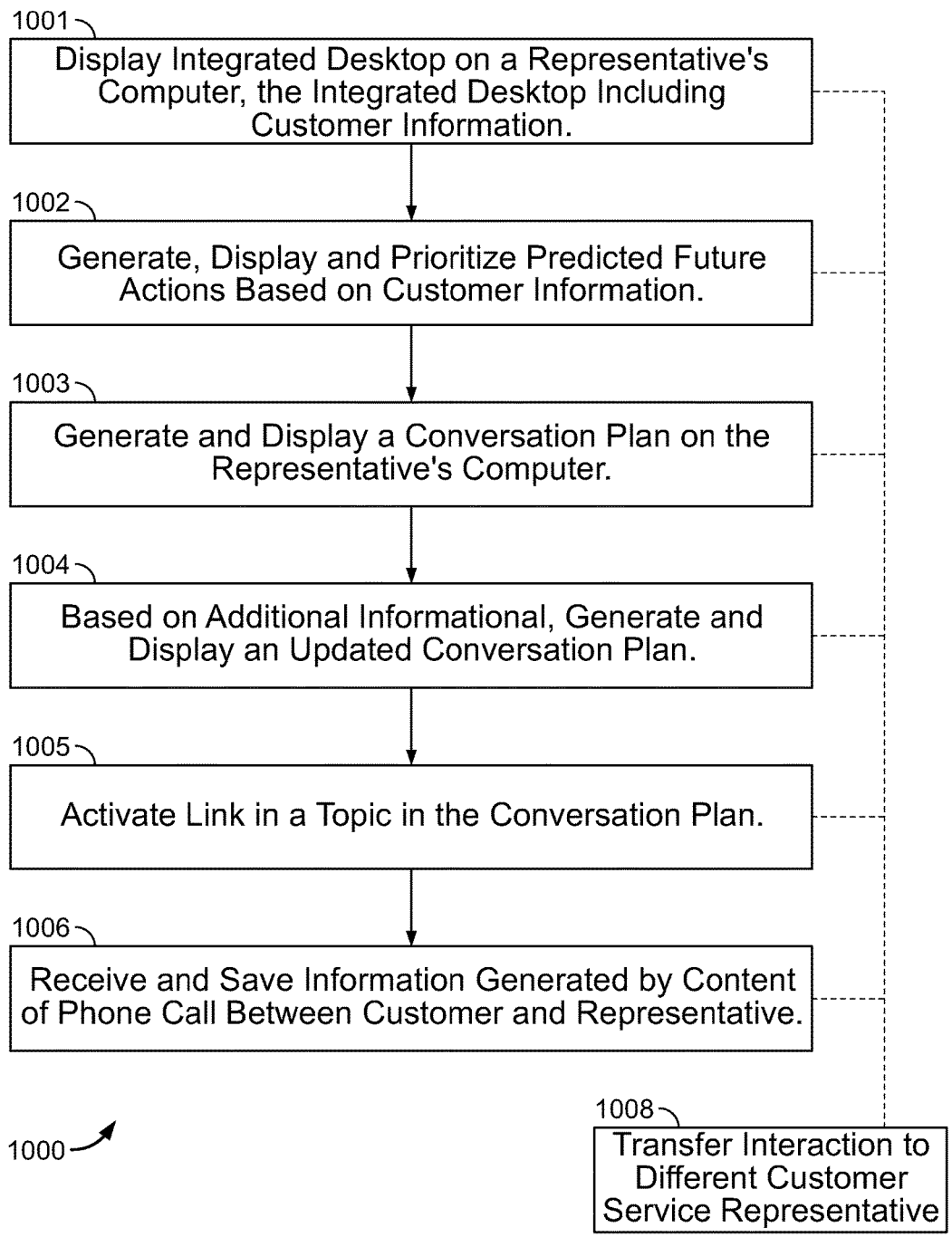
FIG. 3 is an illustration of an embodiment of a computing device.

Turning to FIG. 3, illustrated therein is an exemplary process 1000 of utilizing system 100. Starting at step 1001, interaction with a customer begins and an integrated desktop is displayed on the workstation computer 90 of a representative of a company. The interaction may be an online chat, incoming call by the customer, or the customer service representative being prompted to call the customer and the like. The integrated desktop is a software application or module running in the system 100 that presents information on the workstation computer 90. The integrated desktop creates and presents a plurality of screens related to the customer for review by the customer service representative.

The integrated desktop includes customer information about customers, both current, past and potential. When presenting information to the customer service representative, a customer dashboard is created. The customer dashboard can change from screen to screen but continually provides information related to the customer to facilitate the customer service representative establishing rapport with the customer. By establishing a good interaction with the customer, the customer will tell their story. As a result, the customer service representative gains an understanding of the customer's needs, both recognized and unrecognized, to provide excellent service and advantageous upselling.

Upon receiving the call from the customer, the system 100 utilizes the authentication module 212 to verify the customer's identity and prevent fraud. The customer is initially asked typical information such as their name and/or customer number. Based on the initial information, the data relevant to the customer can be found in the personal information 202 and other locations.

Figure 4:
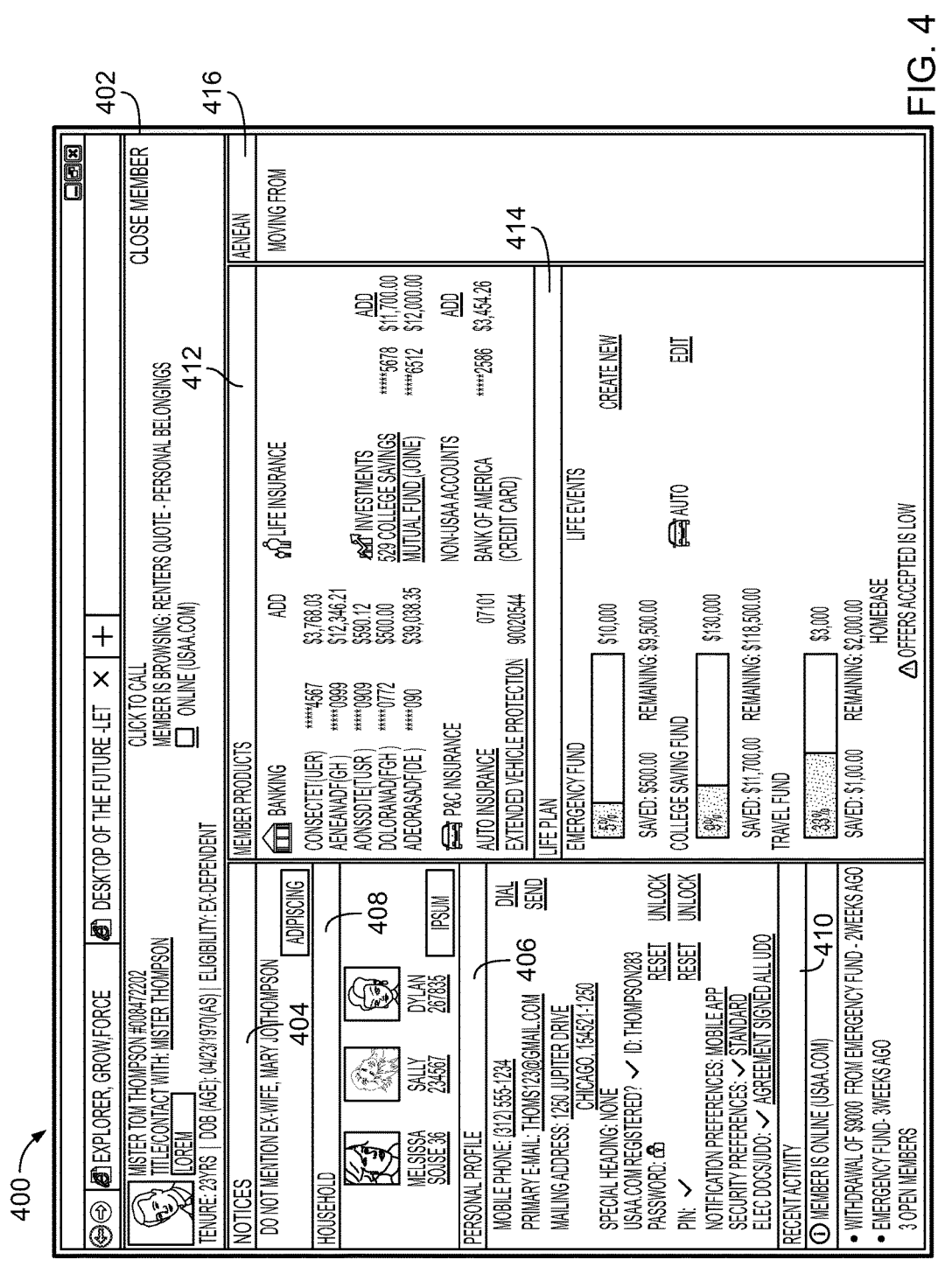

Once the initial customer information is acquired, the system 100 can present an initial screen shot 400 for review by the customer service representative as shown in FIG. 4. The screen shot 400 includes several components of the customer dashboard that can be used, modified, and re-used with other components not shown. One or more portions of the customer dashboard are likely to remain in view of the customer service representative through several screen changes.

The screen shot 400 includes a header portion 402 for a customer named Tom Thompson. The header portion 402 presents basic information right at the top of the screen shot 400 for a clean and simple view of the customer. The header portion 402 includes name, title and authentication status (i.e., high risk authenticated). In this example, the header portion 402 also includes that Mr. Thompson has been a customer of the company for 23 years, his date of birth, and age. As this company requires certain criteria to be met in order to utilize their goods and services, the eligibility criteria of Mr. Thompson is also noted, namely eligibility by, at one time, being the dependent child of an eligible person.

The header portion 402 also includes a current status of the customer, namely that Mr. Thompson is on the company's Web site usaa.com. More detailed information regarding the status of browsing a renters insurance quote is also provided. In the event contact has not yet been established by telephone, the customer service representative can click within the header portion 402 to call the customer. Or, if interaction is terminated, the customer service representative can click within the header portion 402 to close the screen shot 400 and move on to the next interaction.

The screen shot 400 has a notices portion 404 for presenting salient information like topics to avoid (e.g., former spouse) as well as the ability to create additional entries in this section for future reference. A personal profile portion 406 includes contact and system information (e.g., notification and security preferences) along with the ability to perform typical access related tasks (e.g., password and PIN changes) for Mr. Thompson. A household portion 408 includes pictorial identification of the household members along with an ability to update the household. The screen shot 400 also includes a recent activity portion 410 that allows the customer service representative to scroll through the activity of Mr. Thompson in reverse chronological order.

As can be seen, the portions 402, 404, 406, 408, 410 allow the customer service representative to establish baseline knowledge about the customer quickly and easily. In the event that the interaction is by telephone, normal and customary greeting is accomplished to begin building rapport between the customer and customer service representative. A customer products portion 412 provides a view of customer accounts including any accounts related to the household. A life plan portion 414 graphically illustrates various goals identified for the customer. By pairing the customer products portion 412 with the life plan portion 414, the customer service representative has a broad overview of the Mr. Thompson's financial status and outlook. As a result, the customer service representative can review the customer's life situation to identify enhanced product and service offerings or new offerings (i.e., upselling) based on recognized needs even if the customer does not recognize the need.

Still referring to FIG. 4, the screen shot 400 includes a scratchpad notes portion 416. In the scratchpad notes portion 416, the customer service representative can prepare additional notes in paragraph form for review in subsequent interactions.

As can be seen, the screen shot 400 provides conversational, status, product and other information related to the customer, Mr. Thompson. By reviewing the information of the screen shot 400, the customer service representative is better able to have a productive, efficient and smooth dialogue with the customer. It is envisioned that the customer service representative gleans available cues from the screen shot 400 to inform her expectations for the upcoming interaction with the customer. As a result, rapport is maintained and improved.

Further, the same screen shot 400 can be presented to subsequent customer service representatives who may be called upon to interact with the customer due to having a specialty or higher experience level. The subsequent customer service representative can again quickly and easily review the personal information about the customer, the customer's family's information, the customer's age, recent activities the customer has engaged in (e.g., withdrawal of $9,000 from an emergency fund, a fixed rate loan of $40,000), status of the phone call (e.g., if the customer has been transferred and how many times, how long the customer has been on hold, how long the call has lasted), an indication of the customer's preferred nickname (e.g., "Tommy" instead of "Thomas") and the like to establish rapport. Additionally, the screen shot 400 may include a button to accomplish the transfer of the call within the company.

While screenshot 400 is being presented to the customer service representative, the system 100 can perform enhanced authentication using the authentication module 212 without disturbing the conversation flow. In one embodiment, the personal information 102 includes one or more voice samples captured during previous verified interaction with the customer. The system 100 captures additional live voice samples for comparison. If the speaker matches, enhanced authentication is complete and the system 100 proceeds. It is envisioned that the recorded and live voice samples are captured without interruption in the conversation however it is not required.

In an alternative embodiment, the system 100 uses caller identification numbers acquired from the current call for comparison against a caller identification number stored in the personal information 202. If the authentication module 212 determines that the caller identification numbers match, then enhanced authentication is verified without interrupting the conversation. The caller identification number authentication may be instead of or in addition to the other enhanced authentication techniques disclosed herein.

In another embodiment, the authentication module 212 captures hardware-specific data related to one or more mobile devices associated with the customer. The hardware-specific data may include a device serial number, network account information, the version of software running on a mobile phone, type of mobile phone, or other information associated with land lines and the like. By again finding matching information, the system 100 is able to perform enhanced authentication without interrupting the conversation. The hardware-specific authentication may be instead of or in addition to the other enhanced authentication techniques disclosed herein.

Still another embodiment of enhanced authentication utilized media access control (MAC) address. Again, the system 100 captures the MAC address during the conversation and compares the MAC address to a MAC address stored in the personal information 202 without interrupting the conversation. When the authentication module 212 determines a match, enhanced authentication is verified. The MAC address authentication may be instead of or in addition to the other enhanced authentication techniques disclosed herein.

It is envisioned that the original personal information 202 is also populated without interrupting initial conversations. Additionally, the various enhanced authentication techniques may be prioritized so that the order is set. Upon failure of the first enhanced authentication attempt, a predetermined number of repeat attempts may be tried. However, rather than finalizing the process upon a failed enhanced authentication attempt, the system 100 proceeds to attempt enhanced authentication with the next parameter and so on until authentication is successful or all of the parameters have been exhausted.

Figure 6A:
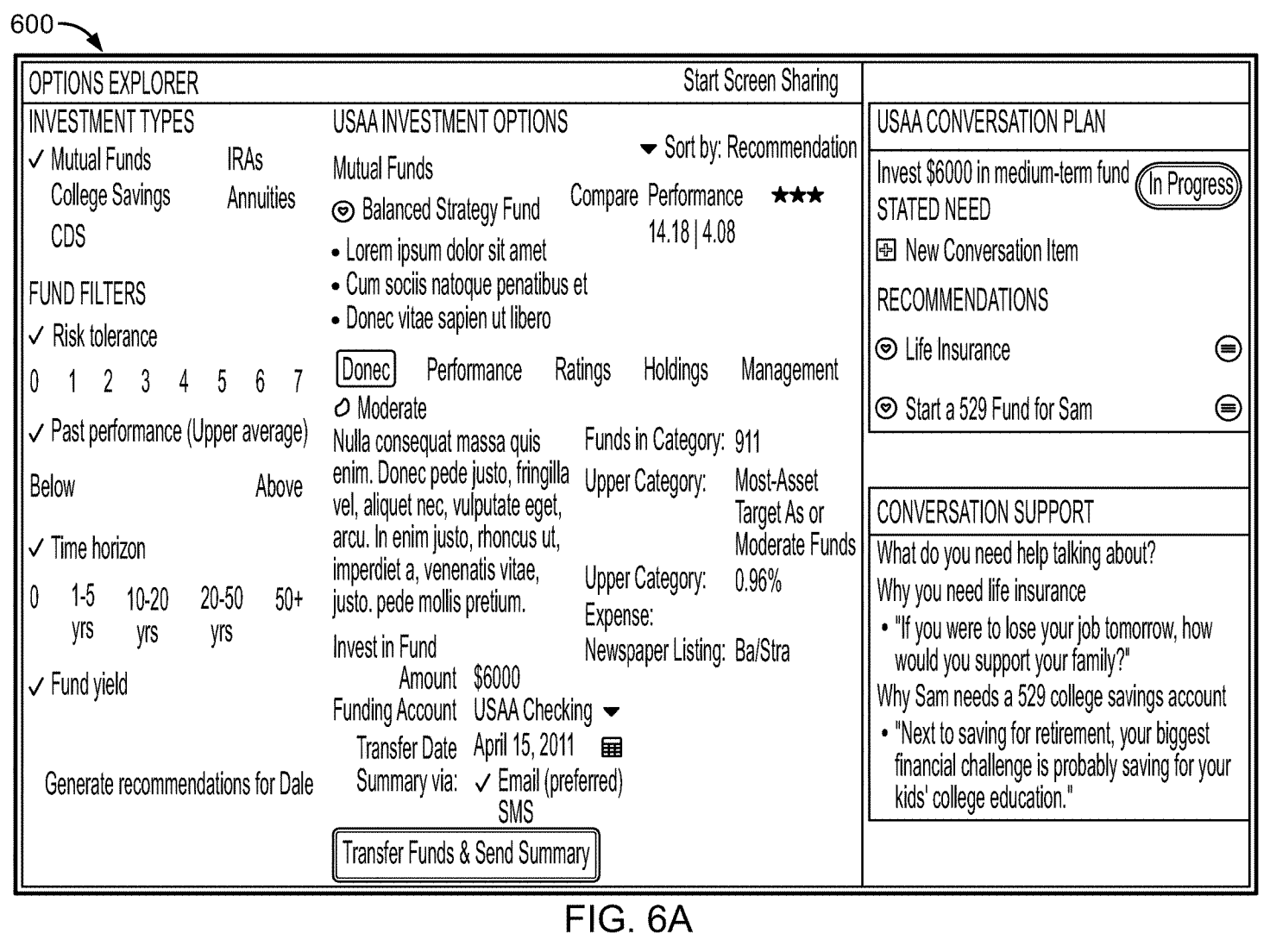

As the interaction with the customer progresses, additional screenshots 500, 600, such as shown in FIGS. 5A and 6A, respectively, may be presented separately or on a split screen for review by the customer service representative(s). In order to provide more clear information regarding screenshot 500, FIG. 5B-D are provided to illustrate subparts of screenshot 500. The details of FIGS. 5A-D are self-explanatory and thus, not described in great detail herein.

In order to provide more clear information regarding screenshot 600, FIG. 6B-E are provided to illustrate subparts of screenshot 600.

Referring now to FIG. 5B, the member dashboard information area 502 for establishing and improving rapport with the customer has been modified and sized to still fit on a left side of the screen shot 500. The dashboard area 502 has a header area 504 including the customer's name, job, photo if available, age, and address along with the ability to edit such information. A notes area 506 shows previous notes and can receive new notes. A household area 508 include family related details, survey results in the form of a satisfaction score, eligibility information, special status, and tenure as a customer.

A preferences area 510 of the dashboard area 502 illustrates the products reviewed by the customer, the rating for same, and a link to further see the details of the review. The preferences area 510 also includes charted channel information, when the customer has Web, mobile, phone, and in-person contact available. A "what's going on" area 512 allows the customer service representative to engage in small talk by presenting the local time and current events in the geographic area of the customer. Effective small talk is not only helpful to overcome small gaps in the conversation flow but fosters development of rapport. Similarly, the dashboard area 502 has an interests area 514 that presents known interests of the customer. Again, by knowing what the customer's interests are, the customer service representative is able to more effectively interact with the customer.

Referring again to FIG. 3, the system 100 may generate, prioritize and display future actions predicted by the customer's information and business rules (step 1002). The screen shots 500, 600 of FIGS. 5A and 6A are examples of the information presented to the customer service representative.

Referring now to FIGS. 5A-D, based upon the information gathered by the customer service representative, the integrated desktop program generates and displays additional information while prioritizing future actions (step 1002 of FIG. 3). The customer service representative typically reviews screenshots 400, 500, 600. Initially, during the interaction with the customer, typically a call, the customer service representative reinforces the customer's connection to the company by being familiar and dexterous with the details related to the customer. As the customer service representative navigates the various screenshots and interacts with the customer, the customer service representative begins to understand the larger context of the customer while encouraging the customer to share their story and enter salient details into the system 100. This process helps the system 100 and the customer service representative to identify the customer's intent and needs.

Referring to FIG. 5C, the additional information for review by the customer service representative is shown in a products area 516 and a life plan area 518. The products area 516 provide a graphical summary of relevant products and services already provided to the client such as a home loan, car loan, mutual fund or other savings plan (e.g., 529 college fund), bank account information, investment information, and health information. The life plan area 518 creates a figure of merit 520 for financial security based on the data related to the customer and possibly other factors. The system 100 generates an "actual" reading of the index 520 based on the customer information. The customer service representative also inputs sentiment from the customer to help generate a "perceived" reading of the index 520. Additionally, goals and outlook of the customer, as identified by the customer service representative, are included in the life plan area 518.

Referring to FIG. 5D, an understand area 522 of screen shot 500 is illustrated. The understand area 522 helps the customer service representative enter, track and document interaction with the customer for use during the interaction and subsequent interactions. The understand area 522 includes a reason for the call and associated time, mood and interest indication. Current aspirations are also updated along with concerns and recent life events that the customer may have. Based upon the interaction and review of the information, the customer service representative can enter details in a call notes section. Similarly, an interaction synthesis and interaction history are included in understand area 522. As can be seen, the system 100 presents a plurality of screens to the customer service representative at their workstation 90 so that the customer service representative can give and take information with the system 90 while interacting with the customer to upsell and otherwise assist the customer to accomplish their goals. Once the customer becomes confident that the customer service representative is working towards the customer's goals, confidence in the company and rapport with the customer service representative occurs.

Figure 6B:
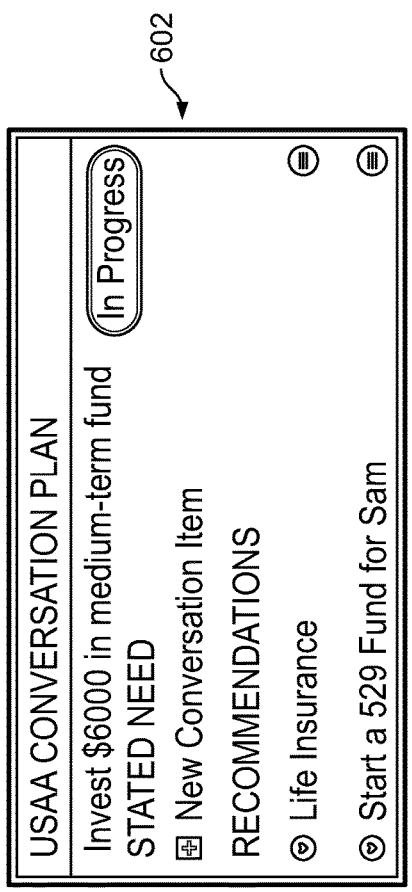

Referring again to FIG. 3, at step 1003, the system 100 may also generate and, prioritize and display a conversation plan 602 (see FIG. 6B), which is part of screen shot 600 of FIG. 6A. The conversation plan may include one or more topics. Each topic may include, for exemplary purposes only, a question for the representative to ask the customer, a topic to be raised, and/or a recent change to the customer's services and/or situation. Further, each topic displayed on the representative's computer may include one or more links, each link providing the ability for the representative to quickly access different information/functionality. For example, if a topic is to ask about the customer's existing car insurance policy, the link may allow the representative to quickly and automatically open the customer's policy (step 1005). In yet another example, if the topic is to ask if the customer would like to initiate life insurance, the link may allow the representative to quickly and automatically access the ability to generate and configure life insurance quotes. It is contemplated herein that the link may be a hyperlink (e.g., such as in web browsers) that opens in the same "page", the link may be a hyperlink that opens a new "page", clicking the link may start a different program/application on the representative's computer, or any other functionally equivalent or similar computerized transition mechanisms as known in the art.

For example, conversation plan area 602 of FIG. 6B illustrates a conversation plan for an in progress interaction between a customer service representative and a customer. The customer is being helped with a $6,000 investment but in view of indications that a new baby had just arrived in the family, the system 100 was recommending that discussion related to life insurance and starting a 529 college saving fund be started for the new baby, Sam.

Figure 6C:
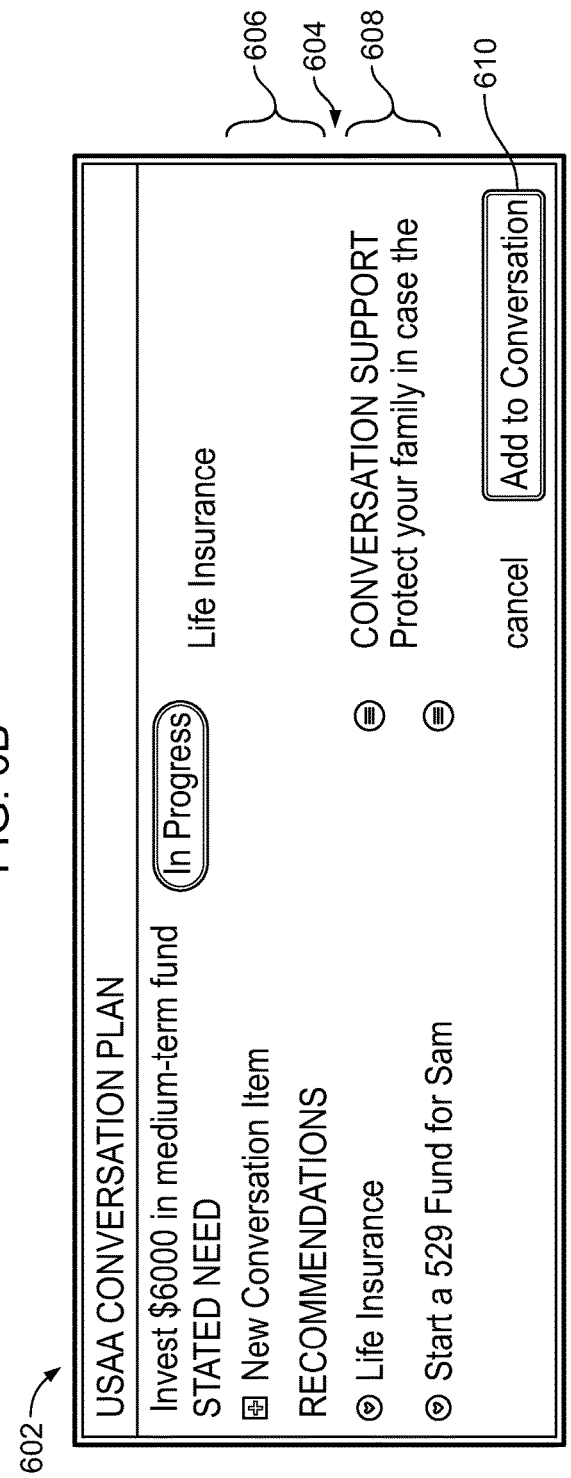
Figure 6F:
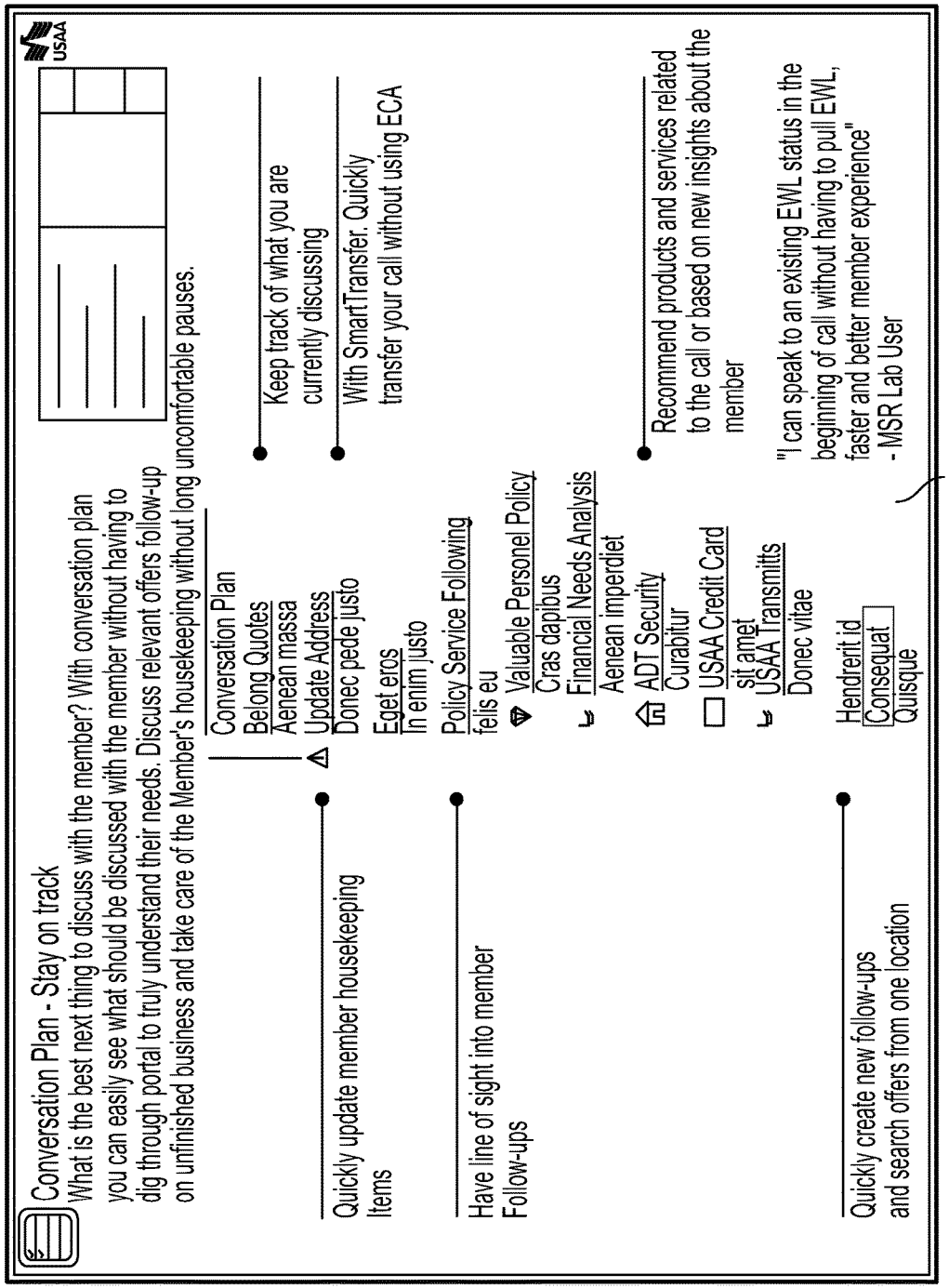

As the customer service transitions into the recommended topics and indicates such, the system 100 presents an additional suggestions and elements area 604 as shown in FIG. 6C. The suggestions and elements area 604 provides talking points 606 and supporting dialog 608 for the customer interaction. The customer service representative can also easily enter these points into the record of the interaction by selecting an "Add to Conversation" button 610. Of course, this technology is equally applicable to "online chat", instant messaging, video conferencing and other forms of interaction. As the interaction proceeds, the system 100 provides additional information as the customer service representative enters additional information about the interaction. For example, a conversation support area 614 as shown in FIG. 6E is presented to the customer service representative to assist with the discussions related to life insurance and 529 college savings accounts.

Referring to FIG. 6D, throughout the customer interaction, the customer service representative is managing the $6,000 investment via the Options Explorer portion 612 of the screen shot 600. It is also envisioned that as data is entered into the system 100 by the customer service representative, the screens 500,600 will change. For Example, FIG. 6E illustrates a changed portion 620 of screen 600. Portion 620 helps the customer service representative discuss relevant offers, follow-up on tasks, and attend to housekeeping for the customer without introducing undesirable pauses in the interaction.

By discussing the customer's needs in view of their current life situation, the customer service representative guides the customer in a discussion of recommended solutions, options and opportunities. Because of the assistance of the integrated desktop program running on the system 100, the customer service representative helps the customer think through concerns and possible objections. By making the customer feel empowered to decide on the course of action, the customer is willing and likely to select solutions, products and services of the company that best address their needs and aspirations. The integrated desktop helps the customer service representative see a global view for the customer and respond when the customer requests assistance. By asking questions to make sure that the customer service representative truly understand the needs of the customer, a shared understanding of the requests and needs is accomplished. From this point, the customer and the customer service representative can engage in detailed tactical work, still within the integrated desktop, to bring decisions to fruition and tasks to completion.

In order to complete the designed plan, future action may be required. The customer service representative uses the integrated desktop to create the future plan in a tangible and actionable manner. The customer service representative passes along from the integrated desktop the relevant resources to support the customer in following their personal path to financial security and accomplishing the plan goals. Milestones, deadlines and follow up with the customer are all entered into the integrated desktop. After the interaction, the customer service representative follows up with the customer, upon prompting by the integrated desktop, via the channel of the customer's choice, to deliver tangible evidence of progress and provide support for taking the relevant next steps.

Referring still to FIG. 3, in one embodiment, and in some utilizations, based on information gathered and/or received during the phone call, a new conversation plan may be generated and displayed on the representative's computer (step 1004). For example, if the customer called to cancel their life insurance because money is currently limited, a new conversation plan may be generated that includes a topic that directs the representative to ask the customer if they would like to reconfigure their other policies (e.g., auto insurance, home insurance) to lower the premiums.

Again, information gathered during the phone call is saved to system 100 (step 1006). This information includes, for exemplary purposes only, any information communicated by the customer to the representative (e.g., I would like to increase my auto insurance coverage in a few months), any additional policies that the customer enrolled in (e.g., adding home insurance policy), changes to policies that the customer is enrolled in (e.g., reconfiguring an existing home insurance policy), and/or follow-up activities and/or conversations that may or may not be contingent upon information discussed during the phone call and/or client enrollment and/or reconfiguration of the client's existing enrollment in services.

Referring still to FIG. 3, it is contemplated herein that, in one or more embodiments, at any time in the process 100 of the customer's interaction, responsibility for the customer interaction as well as a screen that may include the customer's information and/or the conversation plan, may be transferred from one representative to another representative (step 1008). For example, if the customer requests specific details about life insurance policies in the customer's state of residence, the call may be transferred to a specialist that is familiar with the questions and/or issues that the customer may present. In this example, a transfer button may be selected in the graphical user interface (GUI) of the first representative, and automatically the customer's phone call may be transferred to the second representative, and the second representative's computer's GUI may include the customer's information as well as displaying possible insurance options that the customer may be interested in. Further, it is contemplated herein that the second representative may first be conferenced into the phone call, and after an introduction is made, the first representative may exit the phone call.

Figure 7:
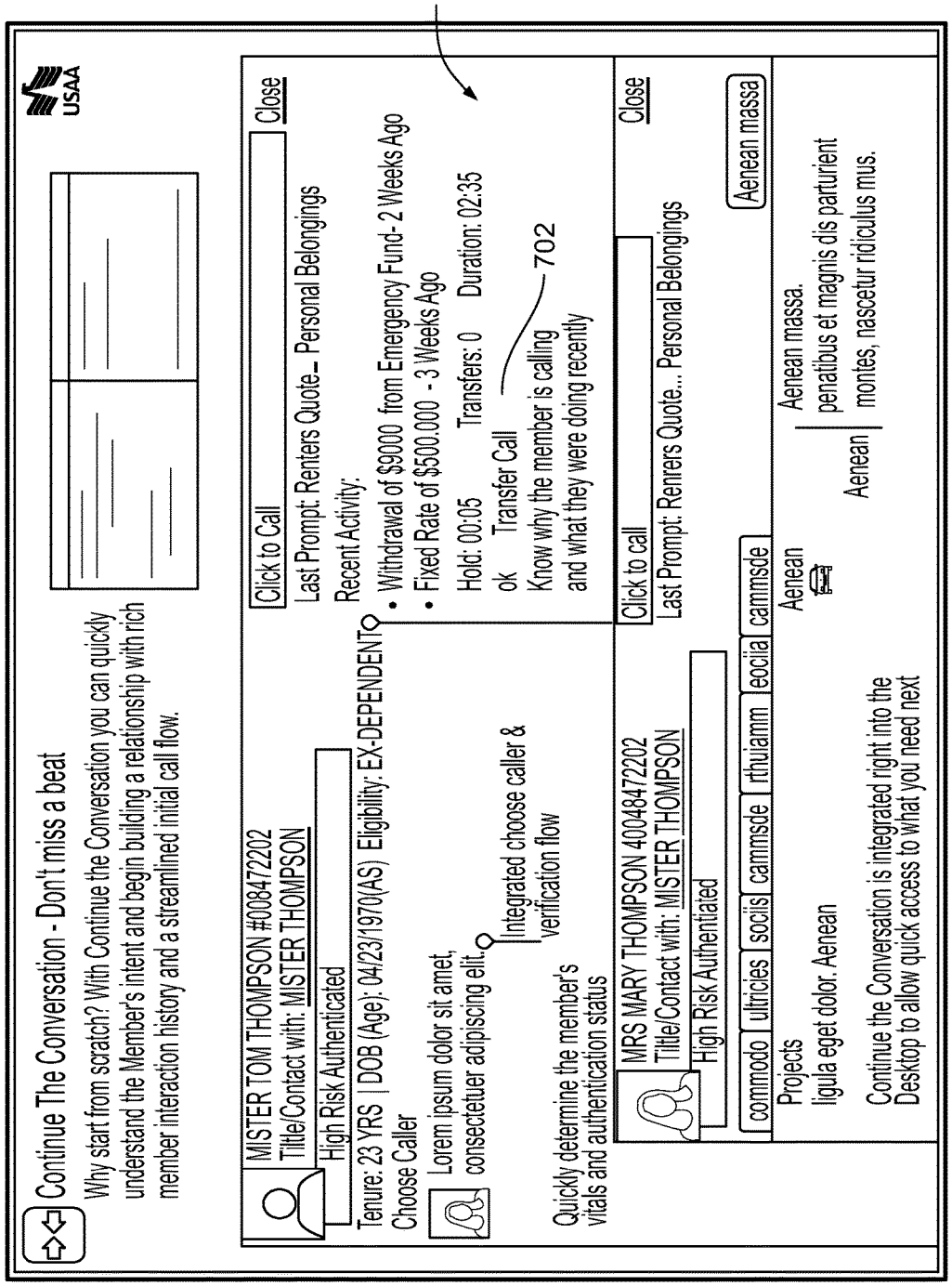
FIG. 7 is still another exemplary screen shot for review by and interaction with a customer service representative in accordance with the subject technology.

For example, FIG. 7 illustrates a portion 700 of a screen shot presented to at least the second customer service representative during a call transfer. The portion 700 may be integrated into previous screens discussed herein or presented as part of a separate screen. The portion 700 includes information to allow for determining the customer's status, last prompt, recent activities and why the interaction is being transferred. Upon getting up to speed, the second customer service representative can select the transfer call button 702. Referring to FIG. 8, an example of a pop-up call transfer synthesis area 800 is shown. Again, the call transfer synthesis area 800 may be automatically provided to both of the involved customer service representatives upon selection of the call transfer option. The call transfer synthesis area 800 includes the reason for the transfer and additional background information about the customer.

As can be seen, it is recognized that the customer service representatives will have different skill and experience levels. Thus, the system 100 may display different conversation plan items based on the skills, training and experience of the customer service representative. Additionally, the education and/or work history of the customer can impact the conversation plan/screens presented to the customer service representative(s).

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprise", "include", and conjugations thereof are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention as defined by the appended claims.

What is claimed is:

1. A computer-implemented method for enhanced authentication of interactions, the method being executed by one or more processors and comprising:
commencing a first interaction between a customer and a customer service representative, the first interaction being through a network connection between a customer computer of the customer and a customer service representative computer of the customer service representative;
capturing first authentication data that is transmitted over the network connection during the first interaction;
commencing a second interaction between the customer and the customer service representative through the network connection;
capturing second authentication data that is transmitted over the network connection during the second interaction;
performing enhanced authentication of the customer without interrupting the second interaction by comparing the first authentication data and the second authentication data;
during the second interaction, identifying a personal event related to the customer;
determining at least one product or service for purchase based on the personal event; and
displaying the at least one product or service on a display of the customer service representative computer.

2. The computer-implemented method of claim 1 further comprising:
determining local events based upon an address of the customer; and
displaying the local events on the display of the customer service representative computer.

3. The computer-implemented method of claim 1, wherein the first and second interactions are telephonic interactions, and wherein the first and second authentication data used to perform the enhanced authentication of the customer each comprise a voice sample of the customer.

4. The computer-implemented method of claim 1, wherein the first and second authentication data used to perform the enhanced authentication of the customer each comprise an identification number associated with the customer.

5. The computer-implemented method of claim 1, wherein the first and second authentication data used to perform the enhanced authentication of the customer each comprise hardware specific data related to a mobile device associated with the customer.

6. The computer-implemented method of claim 1, wherein the first and second authentication data used to perform the enhanced authentication of the customer comprises a Media Access Control (MAC) address associated with the customer.

7. The computer-implemented method of claim 1, wherein performing enhanced authentication of the customer without interrupting the second interaction by comparing the first and second authentication data includes attempting a plurality of authentication techniques to authenticate the customer until the customer is authenticated or the authentication techniques have been exhausted.

8. The computer-implemented method of claim 7, wherein the authentication techniques are ordered based on a priority, and wherein each of the authentication techniques are attempted for a predetermined number of repeat attempts before attempting the next authentication technique or all of the authentication techniques have been exhausted.

9. The computer-implemented method of claim 7, wherein the first and second interactions are on-line chat interactions.

10. The computer-implemented method of claim 7, wherein the customer is a current, past, or potential customer.

11. One or more non-transitory computer-readable storage media coupled to one or more processors and having instructions stored thereon which, when executed by the one or more processors, cause the one or more processors to perform operations for enhanced authentication of interactions, the operations comprising:
commencing a first interaction between a customer and a customer service representative, the first interaction being through a network connection between a customer computer of the customer and a customer service representative computer of the customer service representative;

capturing first authentication data that is transmitted over the network connection during the first interaction;

commencing a second interaction between the customer and the customer service representative through the network connection;

capturing second authentication data that is transmitted over the network connection during the second interaction;

performing enhanced authentication of the customer without interrupting the second interaction by comparing the first authentication data and the second authentication data;

during the second interaction, identifying a personal event related to the customer;

determining at least one product or service for purchase based on the personal event; and displaying the at least one product or service on a display of the customer service representative computer.

12. The one or more non-transitory computer-readable storage media of claim 11, wherein the operations further comprise:

determining local events based upon an address of the customer; and displaying the local events on the display of the customer service representative computer.

13. The one or more non-transitory computer-readable storage media of claim 11, wherein performing enhanced authentication of the customer without interrupting the second interaction by comparing the first and second authentication data includes attempting a plurality of authentication techniques to authenticate the customer until the customer is authenticated or the authentication techniques have been exhausted.

14. The one or more non-transitory computer-readable storage media of claim 13, wherein the authentication techniques are ordered based on a priority, and wherein each of the authentication techniques are attempted for a predetermined number of repeat attempts before attempting the next authentication technique or all of the authentication techniques have been exhausted.

15. The one or more non-transitory computer-readable storage media of claim 14, wherein the authentication techniques include authentication based on at least one of a voice sample of the customer, a caller identification number associated with the customer, hardware-specific data related to a mobile device associated with the customer, or a Media Access Control (MAC) address associated with the customer.

16. A system, comprising:
one or more processors; and
a non-transitory computer-readable storage device coupled to the one or more processors and having instructions stored thereon which, when executed by the one or more processors, cause the one or more processors to perform operations comprising:

commencing a first interaction between a customer and a customer service representative, the first interaction being through a network connection between a customer computer of the customer and a customer service representative computer of the customer service representative;

capturing first authentication data that is transmitted over the network connection during the first interaction;

commencing a second interaction between the customer and the customer service representative through the network connection;

capturing second authentication data that is transmitted over the network connection during the second interaction;

performing enhanced authentication of the customer without interrupting the second interaction by comparing the first authentication data and the second authentication data;

during the second interaction, identifying a personal event related to the customer;

determining at least one product or service for purchase based on the personal event;

and displaying the at least one product or service on a display of the customer service representative computer.

17. The system of claim 16, wherein the operations further comprise:

determining local events based upon an address of the customer; and displaying the local events on the display of the customer service representative computer.

18. The system of claim 16, wherein the first and second interactions are telephonic interactions, and wherein the first and second authentication data used to perform the enhanced authentication of the customer each comprise a voice sample of the customer.

19. The system of claim 16, wherein performing enhanced authentication of the customer without interrupting the second interaction by comparing the first and second authentication data includes attempting a plurality of authentication techniques to authenticate the customer until the customer is authenticated or the authentication techniques have been exhausted.

20. The system of claim 19, wherein the authentication techniques include authentication based on at least one of a voice sample of the customer, a caller identification number associated with the customer, hardware-specific data related to a mobile device associated with the customer, or a Media Access Control (MAC) address associated with the customer.

* * * * *